(No Model.)
T. T. SEAL.
MANDOLIN.
No. 518,900. Patented Apr. 24, 1894.
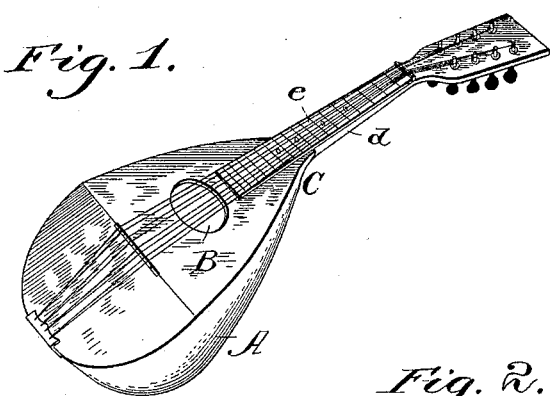
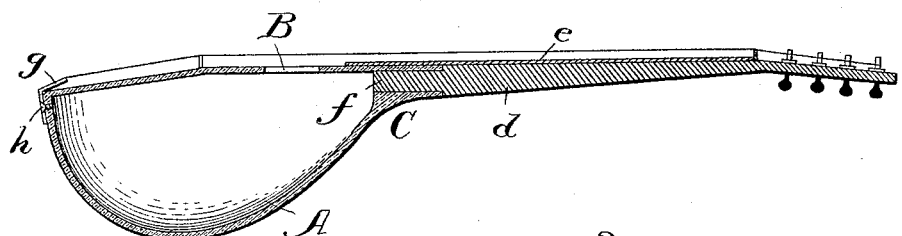
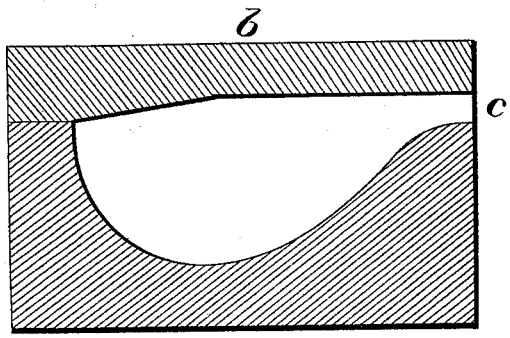
Witnesses:
J. B. McGivv.
Howard H. Dyer.
Inventor.
Theadore T. Seal
by Frank L. Dyer.
Attorney.

UNITED STATES PATENT OFFICE.

THEODORE T. SEAL, OF BELLAIRE, OHIO.

MANDOLIN.

SPECIFICATION forming part of Letters Patent No. 518,900, dated April 24, 1894.

Application filed January 10, 1894. Serial No. 496,396. (No model.)

*To all whom it may concern:*

Be it known that I, THEODORE T. SEAL, a citizen of the United States, residing at Bellaire, in the county of Belmont and State of Ohio, have invented certain new and useful Improvements in Mandolins; and I do hereby declare the following to be a full, clear, and exact description of the invention, which will enable others skilled in the art to which it appertains to make and use the same.

My invention relates to various new and useful improvements in mandolins or other stringed musical instruments.

The particular features of novelty in my improved mandolins reside in the body thereof, which is made of glass. By making the mandolin bodies of glass they can be blown in shape very cheaply and will be more durable than ordinary wooden bodies. I have also found in actual practice that the sounds from a glass body are much sweeter and are of more volume than with an ordinary wooden bodied mandolin.

For a better comprehension of my invention, attention is directed to the accompanying drawings, forming a part of this specification, and in which—

Figure 1 is a perspective view of my improved mandolin. Fig. 2 is a sectional view thereof; and Fig. 3 is a view of the mold in which the mandolin body is to be formed.

In all of the above views corresponding parts are designated by the same letters of reference.

A, is the bowl or body of the mandolin, which is made of glass, blown in a single piece. The general shape of this bowl or body resembles the general shape of any other mandolin, its upper face being slightly apexed as shown, and with the opening B, therein for the ordinary purpose of emitting the sound. This upper face constitutes the sounding board of the mandolin, as heretofore and is of somewhat less thickness than the bowl or body in order that it may readily vibrate. This bowl or body of the mandolin is to be blown of glass preferably in a mold like that shown in Fig. 3. This mold is made in two parts, $a$, and $b$, the former being recessed out to form the lower portion of the body and the part $b$, being slightly apexed, as shown, to form the upper face, or sounding-board, of the mandolin. The opening B, can be either cut in the upper face of the mandolin after it has been blown, or the mold may be so formed as to cause the glass at the opening B, to be formed in a thin film, which can be easily broken away. By making use of a mold such as that shown in Fig. 3, composed of two parts, the joints between the two parts will occur at the edge between the bowl portion of the body and its upper face, and such joints will not therefore detract from the appearance of the completed article. The mold into which the body is to be blown is provided at its upper end with an opening $c$, through which the blow-pipe is introduced. In forming a mandolin body in such a mold, the glass blower takes a sufficient quantity of molten glass on the end of a blow-pipe and opens the mold and inserts the glass therein, with the blow pipe extending up through the opening $c$, and then closes the mold. The glass is then blown into the mold so as to form the body A, and the blow-over therefrom extending up through the opening $c$, is ground off even with the mold and is polished.

The body A, of the mandolin is preferably made of white opaque glass, but it may be made of transparent glass, either ornamented or not. I have found in practice that the bodies of the mandolins may be made of ordinary transparent glass and may be grained in imitation of wood so as to closely resemble ordinary mandolins, but even when this is done, I find that my improved mandolins can be made much more economically than ordinary wooden mandolins. The body A, of the mandolin being thus formed, I attach the neck C, thereto. This neck C, is composed of two parts, $d$, and $e$; the lower part, $d$, being formed with a tenon $f$, thereon, which fits snugly within the open end of the mandolin body; and the flat upper part $e$, which is secured to the lower part $d$, in any suitable way, is glued to the upper face. The tenon $f$, is also coated with glue before being introduced within the opening in the mandolin body, so as to be firmly secured therein. At the end of the body A, is the tail piece $g$, made preferably of metal and secured to the body by means of screws $h$. The neck C, is provided with the ordinary keys thereon, and the mandolin has the strings and bridge piece which are usually made use of.

Although I have shown and described my invention as applying to mandolins, it will be understood that glass bodies may be made use of in connection with guitars, violins, violincellos, and viols, and in fact, to any stringed instrument that has a hollow body having a sounding board over which the strings pass and making use of a neck.

Although I do not wish to be limited to any particular kind of glass out of which to form the body A, I have found that glass of the best quality, such as lead glass, gives by far the best results.

Having now described my invention, what I claim as new therein, and desire to secure by Letters Patent, is as follows:

1. As a new article of manufacture, a mandolin or other musical instrument, having a glass body blown in one piece with a sounding board having an opening B, therein, and with an open cylindrical upper end, and a neck C, having a tenon $f$, thereon, engaging within said open cylindrical upper end and being glued therein, substantially as described.

2. As a new article of manufacture, a mandolin or other musical instrument having a glass body blown in one piece, with a sounding board having an opening B, therein, and with an open cylindrical upper end; and a neck C, consisting of a lower part $d$, having a tenon $f$ thereon, engaging with said open cylindrical upper end, and glued therein, and the upper part $e$, secured to said lower part $d$, and glued to the sounding board of the instrument, substantially as described.

In testimony whereof I affix my signature in presence of two witnesses.

THEODORE T. SEAL.

Witnesses:
MARION R. SEAL,
F. T. BOYD.